(12) United States Patent
Danowski et al.

(10) Patent No.: US 9,995,342 B2
(45) Date of Patent: Jun. 12, 2018

(54) SELF-ADJUSTING BUSHING BEARING WITH SHAFT SEAL

(71) Applicant: CADventures, Inc., Sycamore, IL (US)

(72) Inventors: Thomas J. Danowski, Sycamore, IL (US); Douglas A. Larson, Ann Arbor, MI (US)

(73) Assignee: CADVENTURES, Inc., Sycamore, IL (US)

( * ) Notice: Subject to any disclaimer, the term of this patent is extended or adjusted under 35 U.S.C. 154(b) by 0 days. days.

(21) Appl. No.: 15/358,859

(22) Filed: Nov. 22, 2016

(65) Prior Publication Data
US 2017/0146065 A1 May 25, 2017

Related U.S. Application Data

(60) Provisional application No. 62/258,695, filed on Nov. 23, 2015.

(51) Int. Cl.
| | | |
|---|---|---|
| *F16C 17/10* | (2006.01) | |
| *F16C 33/74* | (2006.01) | |
| *F16C 23/04* | (2006.01) | |
| *F16C 27/02* | (2006.01) | |
| *F16C 25/04* | (2006.01) | |
| *F16C 33/04* | (2006.01) | |

(52) U.S. Cl.
CPC .............. *F16C 33/74* (2013.01); *F16C 17/10* (2013.01); *F16C 23/04* (2013.01); *F16C 25/04* (2013.01); *F16C 27/02* (2013.01); *F16C 33/046* (2013.01)

(58) Field of Classification Search
CPC .......... F16C 27/00; F16C 27/02; F16C 27/06; F16C 33/74; F16C 33/7886; F16C 33/723; F16C 17/10; F16C 23/04; F16C 33/046; F16C 25/04
See application file for complete search history.

(56) References Cited

U.S. PATENT DOCUMENTS

| 1,331,522 A | 2/1920 | Parson et al. |
| 1,852,501 A | 4/1932 | Zipay |
| (Continued) | | |

FOREIGN PATENT DOCUMENTS

| DE | 965096 C | * 5/1957 | ............ F16C 23/045 |
| DE | 3244258 | 5/1984 | |
| | (Continued) | | |

OTHER PUBLICATIONS

Unpublished U.S. Appl. No. 14/961,368, filed Dec. 7, 2015, entitled "Self-Adjusting Bushing Bearing Having a Springy Element".

*Primary Examiner* — Alan B Waits
(74) *Attorney, Agent, or Firm* — Andrus Intellectual Property Law, LLP

(57) ABSTRACT

Self-adjusting bushing bearing with a shaft seal for engaging a shaft. The self-adjusting bushing bearing has a plurality of bearing segments configured to receive a shaft therein. A springy element engages an outer surface of the plurality of bearing segments and biases the plurality of bearing segments towards the shaft. A shaft seal coupled to the springy element is configured to contact the shaft when the shaft is received in the plurality of bearing segments so as to create an operable seal between the shaft and the housing.

16 Claims, 18 Drawing Sheets

(56) References Cited

U.S. PATENT DOCUMENTS

| | | | | |
|---|---|---|---|---|
| 2,187,359 A * | 1/1940 | Miller | | F16C 27/02 384/99 |
| 2,767,034 A | 10/1956 | McCloskey | | |
| 2,826,464 A * | 3/1958 | Hawk, Sr. | | F16C 27/066 384/202 |
| 2,953,000 A | 9/1960 | Ressler et al. | | |
| 2,986,432 A * | 5/1961 | Schlauch | | F16C 27/066 384/536 |
| 3,266,855 A | 8/1966 | Cleff | | |
| 3,431,033 A * | 3/1969 | Dangauthier | | F16C 27/02 384/125 |
| 3,485,540 A * | 12/1969 | Nogle | | F01D 25/164 384/119 |
| 3,589,781 A * | 6/1971 | Hanley | | F16C 17/02 384/152 |
| 3,597,025 A | 8/1971 | Ringel | | |
| 3,744,859 A | 7/1973 | Ringel | | |
| 3,913,989 A * | 10/1975 | Williams | | F16C 17/045 384/123 |
| 4,022,515 A * | 5/1977 | Hermanns | | D01H 4/12 384/235 |
| 4,057,355 A | 11/1977 | Allison | | |
| 4,139,245 A * | 2/1979 | McCloskey | | F16C 11/0614 280/506 |
| 4,611,931 A * | 9/1986 | Brandenstein | | F16C 19/163 277/561 |
| 4,706,971 A | 11/1987 | Schirmer | | |
| 4,844,650 A | 7/1989 | Zapushek et al. | | |
| 4,854,751 A * | 8/1989 | Grassmuck | | F16C 27/066 384/476 |
| 5,370,404 A * | 12/1994 | Klein | | F16C 27/066 277/572 |
| 5,463,861 A * | 11/1995 | Lorenz | | D02G 1/06 384/504 |
| 5,533,815 A * | 7/1996 | Schierling | | F16C 27/066 192/207 |
| 5,564,853 A | 10/1996 | Maughan | | |
| 5,714,818 A * | 2/1998 | Eakman | | F16C 17/02 310/90.5 |
| 5,895,202 A * | 4/1999 | Dauvillier | | F04D 19/04 415/229 |
| 5,913,812 A | 6/1999 | Smith et al. | | |
| 6,039,322 A * | 3/2000 | Stadler | | F16C 27/066 277/551 |
| 6,091,175 A * | 7/2000 | Kinsinger | | F16C 27/063 277/438 |
| 6,286,837 B1 | 9/2001 | Humphrey | | |
| 6,550,974 B2 * | 4/2003 | Zoppitelli | | F16C 23/084 384/498 |
| 6,811,315 B2 * | 11/2004 | Fournier | | F16C 17/042 384/105 |
| 8,641,285 B2 * | 2/2014 | Roessler | | F16C 17/02 384/152 |
| 8,870,459 B2 | 10/2014 | Danowski | | |
| 9,526,198 B2 * | 12/2016 | Johansson | | A01B 71/04 |
| 2004/0195778 A1 * | 10/2004 | Smith | | F16C 27/066 277/549 |
| 2011/0081231 A1 * | 4/2011 | Hoelzer | | F04D 19/042 415/119 |

FOREIGN PATENT DOCUMENTS

| | | | |
|---|---|---|---|
| EP | 0205800 | 4/1986 | |
| FR | 2433129 A1 * | 3/1980 | F16C 23/045 |
| GB | 374338 | 6/1932 | |
| GB | 391960 | 5/1933 | |
| GB | 1458047 A * | 12/1976 | F16C 25/04 |

* cited by examiner

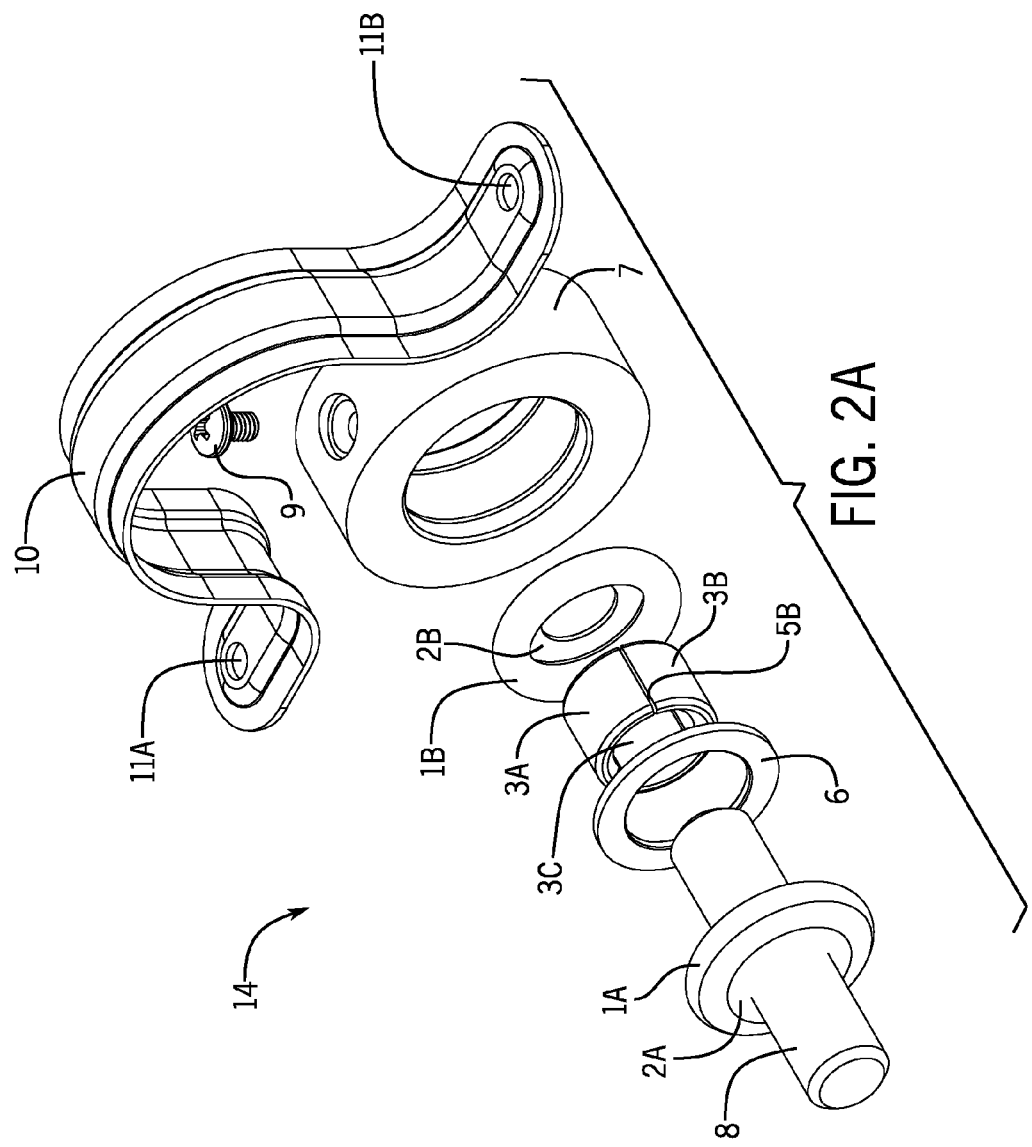

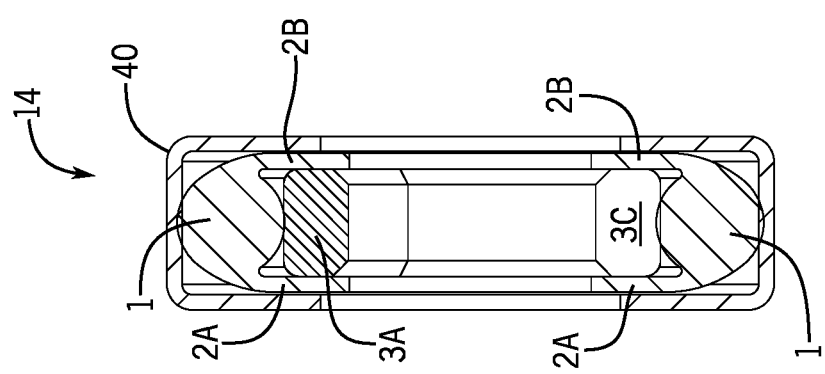

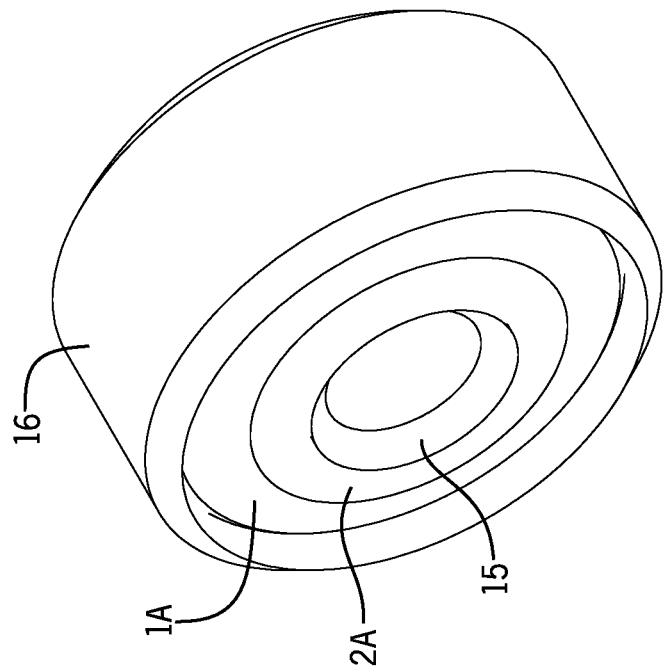
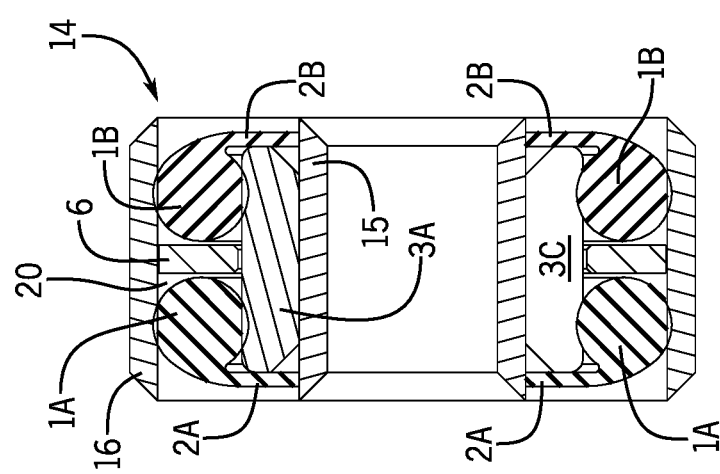

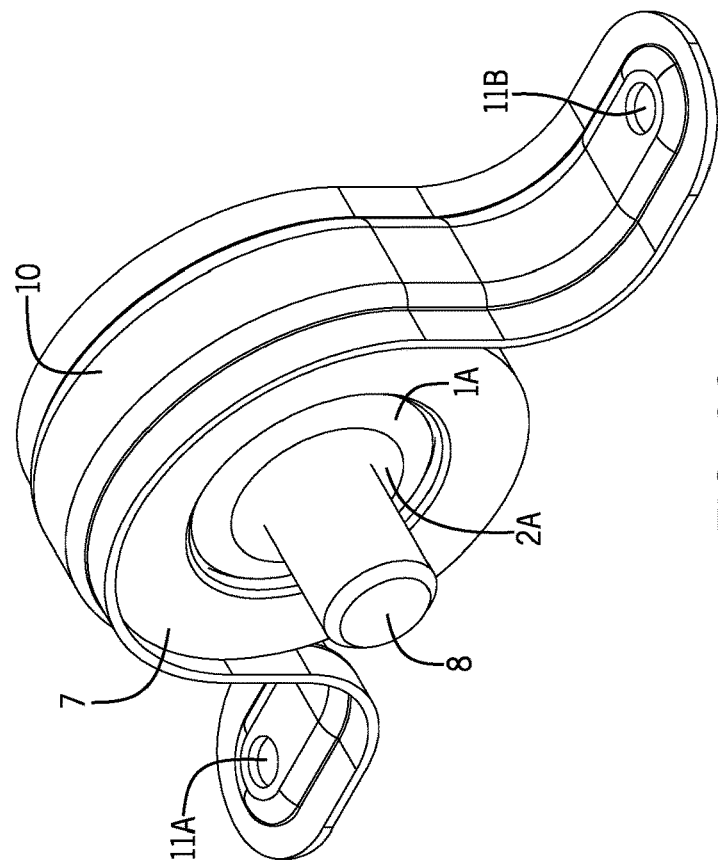
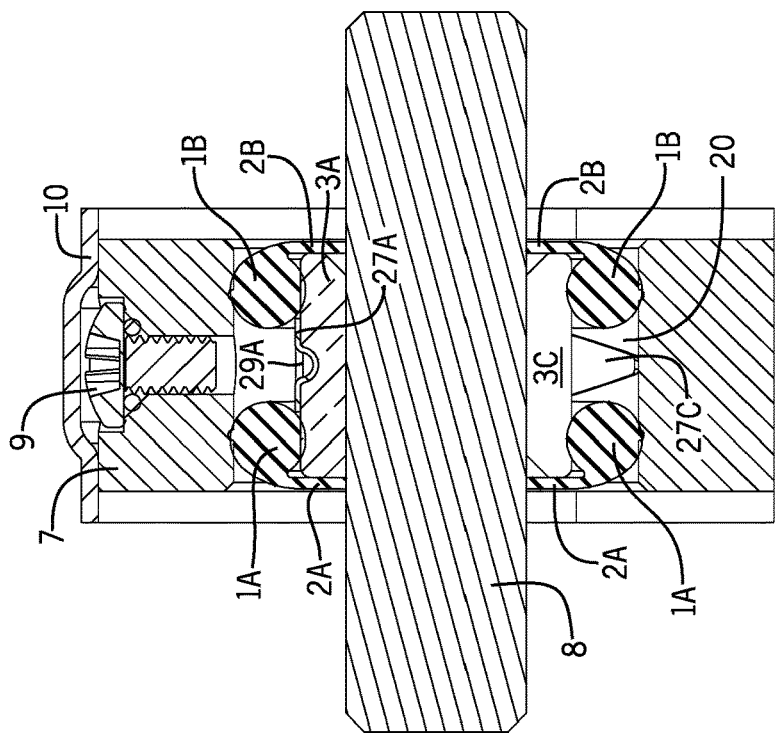

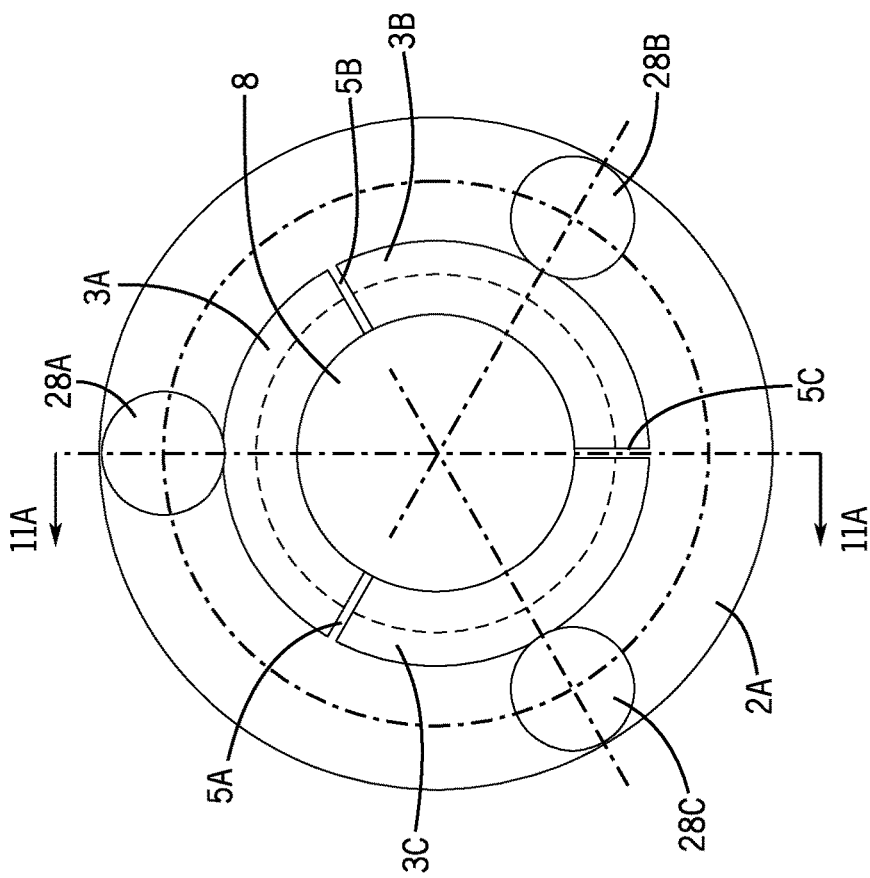
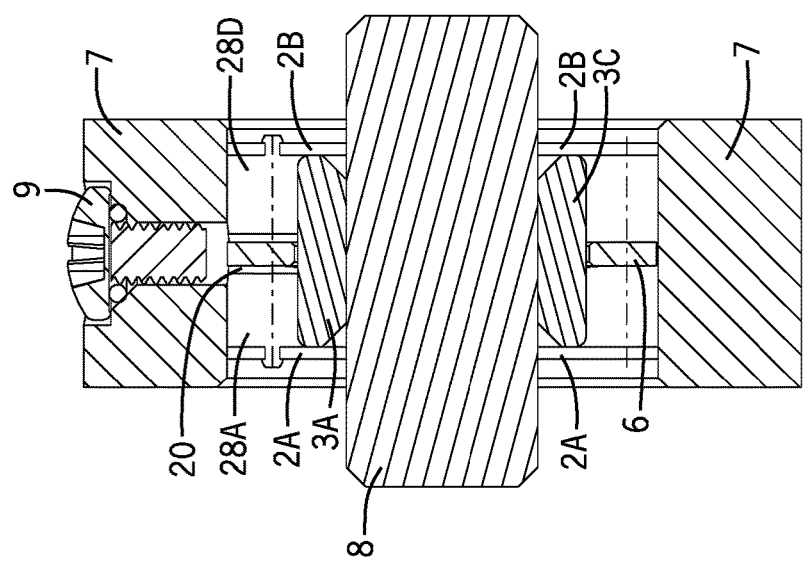
FIG. 11B
FIG. 11A

SELF-ADJUSTING BUSHING BEARING WITH SHAFT SEAL

CROSS-REFERENCE TO RELATED APPLICATION

This application claims the benefit of and priority to U.S. Provisional Patent Application No. 62/258,695, filed Nov. 23, 2015, which is hereby incorporated by reference in entirety.

FIELD

The present disclosure relates to bushing bearings, and more specifically self-adjusting bushing bearings having a shaft seal.

BACKGROUND

The following U.S. patent and Publication are hereby incorporated herein by reference, in entirety.

U.S. Pat. No. 8,870,459 discloses a self-adjusting bushing bearing for engagement with a shaft. A bearing housing is provided. A bearing sub-assembly is received inside of the bearing housing and the bearing sub-assembly is adapted to receive the shaft. The bearing sub-assembly has at least two bearing segments and at least one springy element engaged with the bearing housing which compresses the bearing segments toward one another.

U.S. patent application Ser. No. 14/961,368 discloses a self-adjusting bushing bearings having a springy element. The self-adjusting bushing bearing has a bearing subassembly that is configured to be received in a housing and also has a plurality of bearing segments that together are configured to receive a shaft therein. A springy element biases the plurality of bearing segments radially inwardly towards the shaft. The springy element is mated with at least one bearing segment in the plurality of bearing segments.

SUMMARY

This Summary is provided herein to introduce a selection of concepts that are further described herein below in the Detailed Description. This Summary is not intended to identify key or essential features from the claimed subject matter, nor is it intended to be used as an aid in limiting the scope of the claimed subject matter.

The present disclosure relates to a self-adjusting bushing bearing with a shaft seal for engaging a shaft. The self-adjusting bushing bearing has a plurality of bearing segments configured to receive a shaft therein. A springy element engages an outer surface of the plurality of bearing segments and biases the plurality of bearing segments towards the shaft. A shaft seal coupled to the springy element is configured to contact the shaft when the shaft is received in the plurality of bearing segments so as to create an operable seal between the shaft and the housing.

In one embodiment, the self-adjusting bushing bearing is receivable within a housing and configured to control movement of a shaft therein and has a plurality of bearing segments configured to receive the shaft therein. A first springy element and a second springy element each disposed between the housing and the plurality of bearing segments, wherein the first springy element and the second springy element are configured to bias the plurality of bearing segments radially inwardly towards the shaft. A first shaft seal is coupled at a first end to the first springy element and extends radially inwardly to contact the shaft at a second end that is opposite the first end. A second shaft seal is coupled at a first end to the second springy element and extends radially inwardly to contact the shaft at a second end that is opposite the first end, wherein the first shaft seal and the second shaft seal each form an operable seal between the plurality of bearing segments and the shaft.

In one embodiment, a system to control movement of a shaft within a housing and having a first self-adjusting bushing bearing has a first plurality of bearing segments configured to receive the shaft therein and is configured to provide an operable seal between the first plurality of bearing segments and the shaft. A first springy element is disposed between the housing and the first plurality of bearing segments, wherein the first springy element is configured to bias the first plurality of bearing segments radially inwardly towards the shaft. A first shaft seal is coupled at a first end to the first springy element and extends radially inwardly to contact the shaft at a second end that is opposite the first end, wherein the first shaft seal forms an operable seal between the first plurality of bearing segments and the shaft. The housing contains the first springy element and the first shaft seal, the first plurality of bearing segments, and the shaft.

BRIEF DESCRIPTION OF DRAWINGS

FIG. 2A is an exploded view of another exemplary SABB with two shaft seals.

FIG. 4C is a side cross-sectional view of a SABB similar to that shown in FIG. 4B, but having a steel housing around the outer circumference of the SABB.

FIG. 5A is a side cross-sectional view of a SABB with two shaft seals similar to that shown in FIGS. 1A-D, but having inner and outer shipping tubes to permit pre-lubrication of the SABB without a shaft or bearing housing.

FIG. 5B is a perspective view of the SABB shown in FIG. 5A.

FIG. 9B is a view of section A-A taken in FIG. 9A.

FIG. 9C is a perspective view of the SABB shown in FIG. 9B.

FIGS. 11A & 11B are a sectional view and an end view of another exemplary SABB with a shaft seal, respectively.

DETAILED DESCRIPTION OF THE DRAWINGS

Figure 1B:
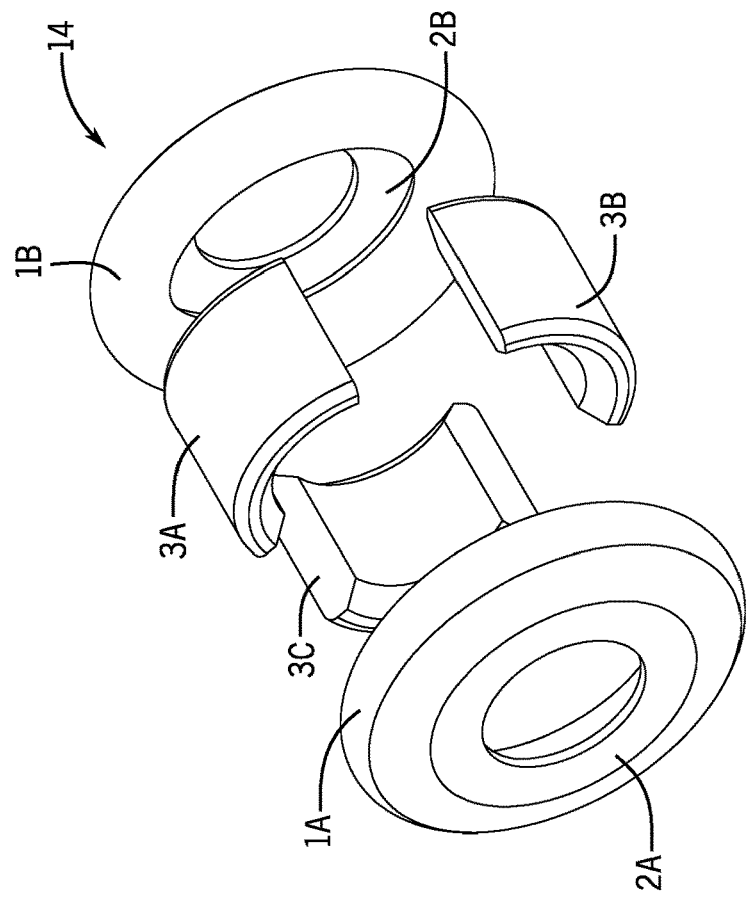
FIG. 1B is an exploded view of the SABB shown in FIG. 1A.
Figure 1A:
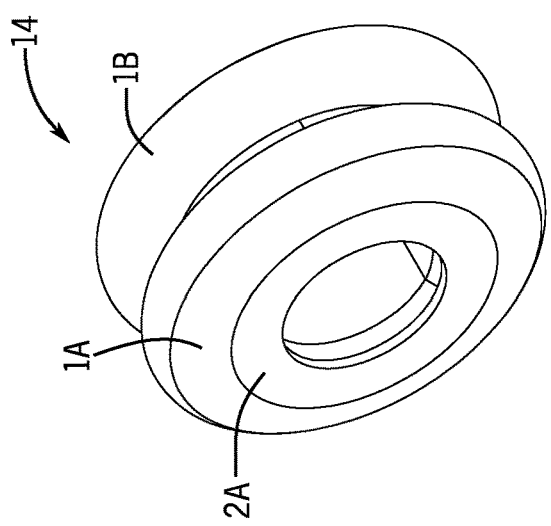
FIG. 1A is a perspective view of an exemplary Self-Adjusting Bushing Bearing (SABB) with a shaft seals.
Figure 1C:
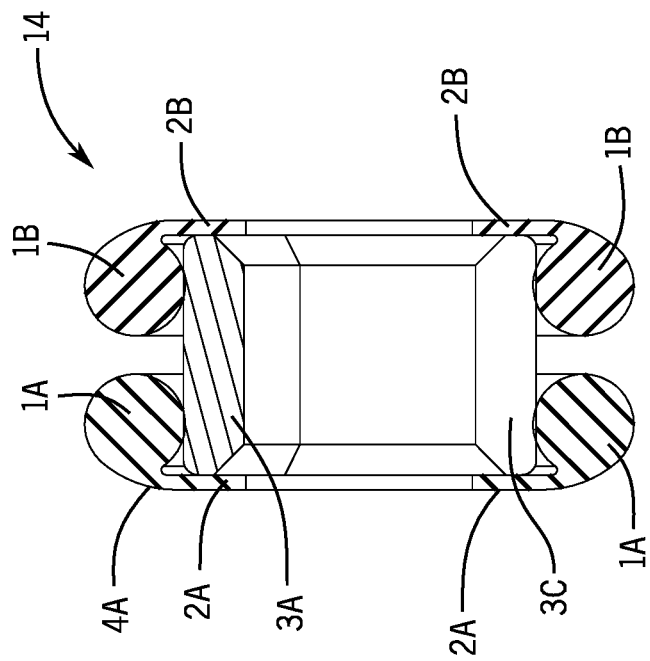
FIG. 1C is an end view of the SABB shown in FIG. 1A.
Figure 1D:
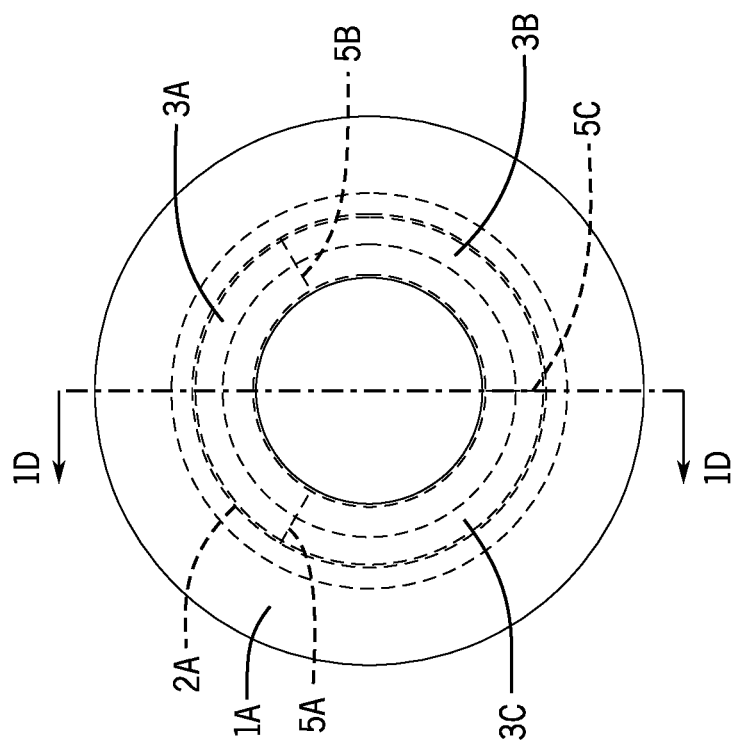
FIG. 1D is a view of section A-A taken in FIG. 1C.

Self-Adjusting Bushing Bearings (SABBs) are generally known in the art, exemplified by the devices disclosed in U.S. Pat. No. 8,870,459. SABBs are generally known to comprise at least two bearing segments configured to receive a shaft, also having at least one springy element that engages the outside surfaces of the bearing segments to compress the bearing segments toward one another in an inward direction. This springy element also contacts the inside surface of a housing when the SABB is received within the housing. In this regard, the springy elements bias the bearing segments into contact with the shaft when a shaft is received inside the SABB, maintaining this contact despite wear of the elements. This use of springy elements generally allows the machining tolerances of the shaft and housing containing the SABB to not be near as tight as required for standard bushing, ball, and roller bearings. Furthermore, the springy elements allow the same SABB to accommodate both conical and cylindrical shafts.

Through research and experimentation, the present inventors have recognized and endeavored to solve problems associated with bushing bearings and ball bearings.

The present inventors have found that a disadvantage of known bushing bearings is that, unlike ball bearings, they do not have seals. This prevents the bearings from being flooded with lubricant, limiting the service duration and load capability. Even when a bushing bearing is initially impregnated with lubricant, the lack of seals allows the lubricant to migrate out from the lubricant-impregnated bushing bearing material.

Another drawback of this lack of seals is that bushing bearings are vulnerable to contamination, such as dirt or water. This limits applications for using bushing bearings, prohibiting such applications as within water pumps without additional seals.

Through research and experimentation, the present inventors have found that merely coupling a seal to a bearing housing to seal the shaft does not provide an optimal solution as the seal cannot accommodate substantial amounts of angular motion of the shaft relative to the bearing housing. Garter springs are also often required to effectively seal against a rotating shaft when internal fluid pressure is present. This too limits the applications and increases the cost for using bushing bearings, and can also hasten failure.

The SABB with a shaft seal presently disclosed is an improvement upon the "springy element" in the Self-Adjusting Bushing Bearing shown in U.S. Pat. No. 8,870,459. The integration of a shaft seal allows the SABB to be sealed from outside contaminants similar to sealed ball and roller bearings. The shaft seal also allows for additional lubricant within the bearing assembly to continually flood the bearing segments, similar to the flooded lubrication of connecting rod bushing bearings on the crankshaft of an automotive engine. Furthermore, the shaft seal can be oriented to eliminate the need for garter springs used in traditional pressurized fluid shaft seals.

Methods of making an SABB with a shaft seal are also provided herein, as well as methods for installing the SABB with a shaft seal after pre-assembling and pre-lubricating the subassembly.

Although the "SABB with a shaft seal" of the present disclosure is distinguishable from the SABBs known in the prior art, the term "SABB" is used herein to describe the presently disclosed device unless otherwise stated.

FIGS. 1A-D show a Self-Adjusting Bushing Bearing (SABB) 14 known in the art, but with shaft seals 2A, 2B coupled at first ends to the springy elements 1A, 1B, respectively. The shaft seals extend in a radially-inward direction from the springy elements, enclosing the end surfaces of the bearing segments 3A, 3B, 3C that are perpendicular to the outside surfaces of the bearing segments.

Figure 2B:
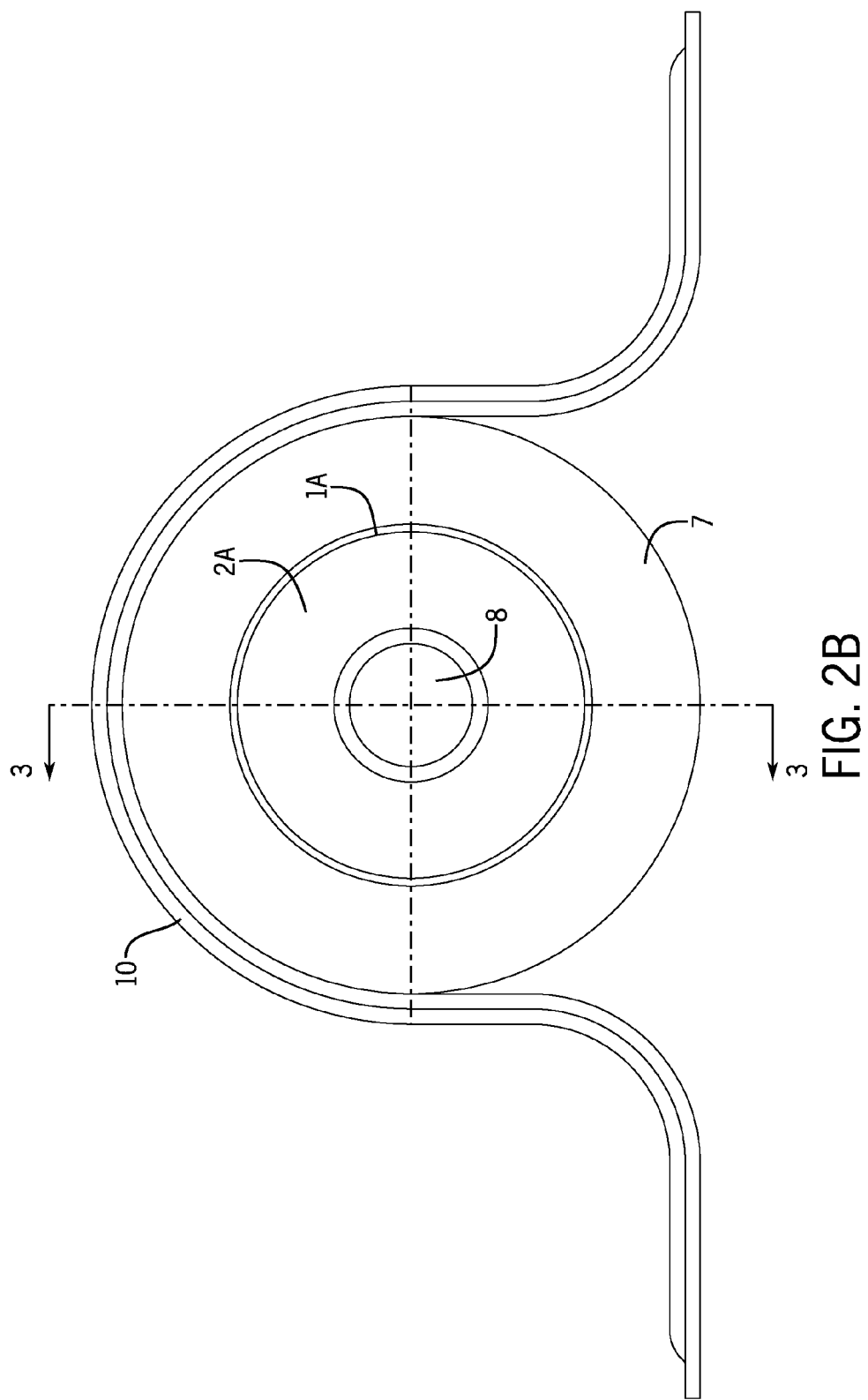
FIG. 2B is an end view of the SABB shown in FIG. 2A.

Second ends of shaft seals 2A, 2B extend into the area in which the bearing segments are configured to receive a shaft (e.g., shaft 8 shown in FIG. 2A). Specifically, the shaft seals are configured to contact the outside surface of a shaft when the shaft is received within the SABB 14 so as to create a seal with the shaft. Accordingly, the shaft seals 2A, 2B and springy elements 1A, 1B create an operable seal between the shaft 8 and the housing 7, allowing retention of a lubricant 20 inside the SABB 14 (shown in FIG. 3).

The shaft seals 2A, 2B may be fabricated independently from the springy elements 1A, 1B, or as a combined element as shown in FIGS. 1A-D. The combined springy element/shaft seal can be a molded part of the same material or co-molded (multi-shot molding) with different materials for the springy element and shaft seal portions. An advantage of manufacturing the springy element and shaft seals using different materials is that the materials can have different hardness, durometers, and coefficients of friction. For example, a relatively soft silicone rubber shaft seal could be used with a relatively hard durometer Buna-N rubber O-Ring as the springy element. Shaft seal performance may also be enhanced geometrically, for example, by continuously tapering the thickness of the shaft seal 2A from the springy element 1A to the shaft 8.

Alternatively, the shaft seals and springy elements can be fabricated separately and later coupled together. For example, the springy elements may be O-rings and the shaft seals may be elastomeric washers. Depending on the elastomers, the bond can be a solvent weld, such as with neoprene. The bond can also be glued such as with "super glue" used to fabricate custom sized O-rings from O-ring cord stock.

Figure 10A:
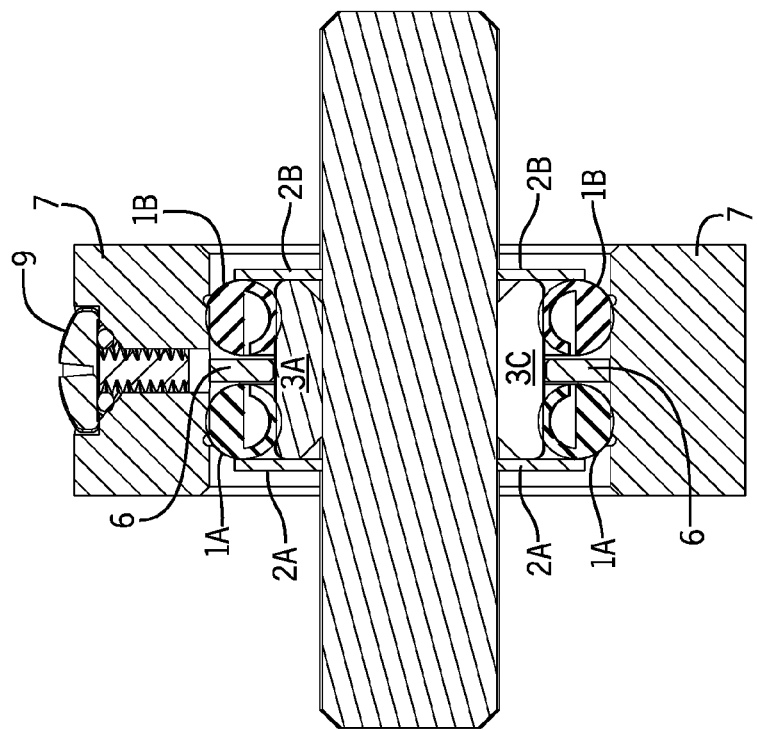
FIG. 10A is a side cross-sectional view of a SABB similar to that shown in FIG. 3, but without angular deflection and with the springy elements having a "C" cross-sectional shape.
Figure 10B:
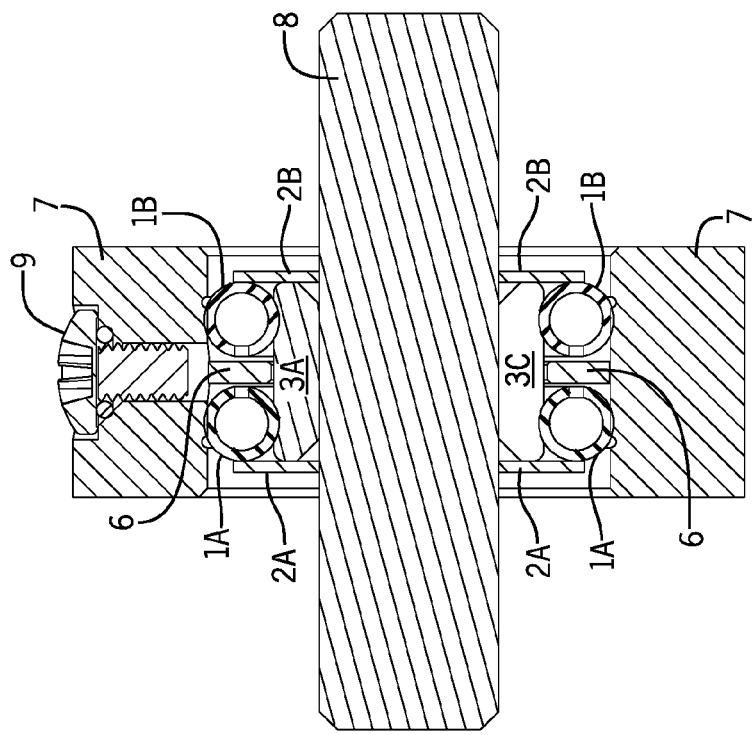
FIG. 10B is a side cross-sectional view of a SABB similar to that shown in FIG. 3, but with the springy elements having an "e" cross-sectional shape.

It should be noted that while the FIGURES primarily depict the springy element as either having a rectangular or circular cross-sectional shape, other functional configurations would be known to a person having ordinary skill in the art. For example, the cross-section could be a circular ring having an open center, an "e" shape, or a "c" shape, which provide different force magnitude and performance characteristics to customize the SABB for a specific application. Exemplary embodiments in which the springy element has a cross-section shaped like a "c" and shaped like an "e" are shown in FIGS. 10A and 10B, respectively.

Figure 4B:
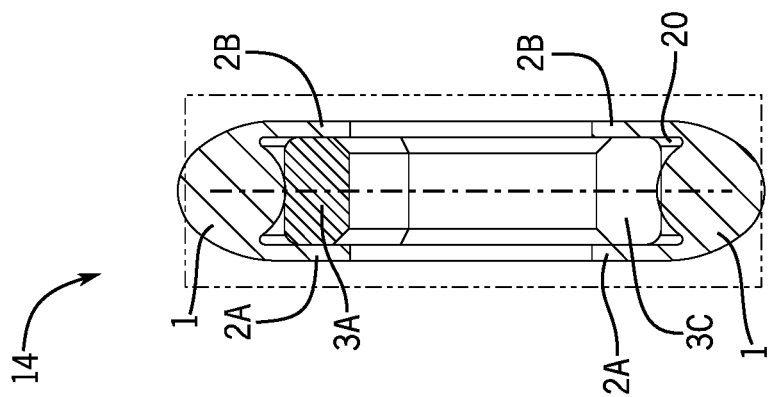
FIG. 4B is a side cross-sectional view of the SABB shown in FIG. 4A.
Figure 4A:
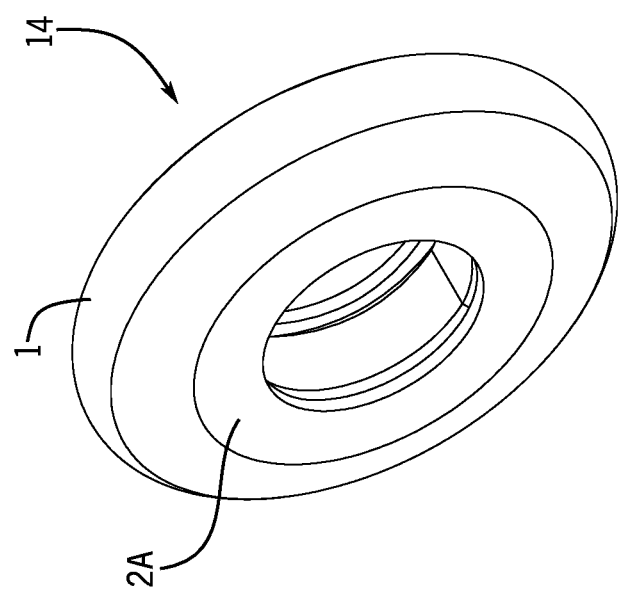
FIG. 4A is a perspective view of another exemplary SABB with two shaft seals.
Figure 4E:
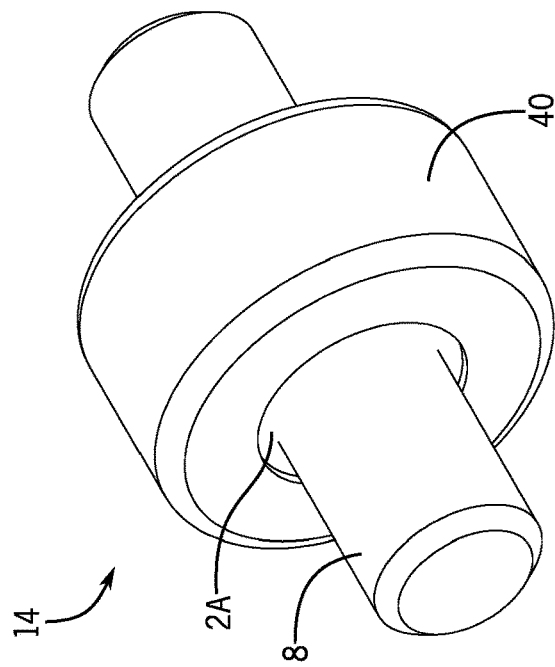
FIG. 4E is a perspective view of the SABB shown in FIG. 4D.
Figure 7:
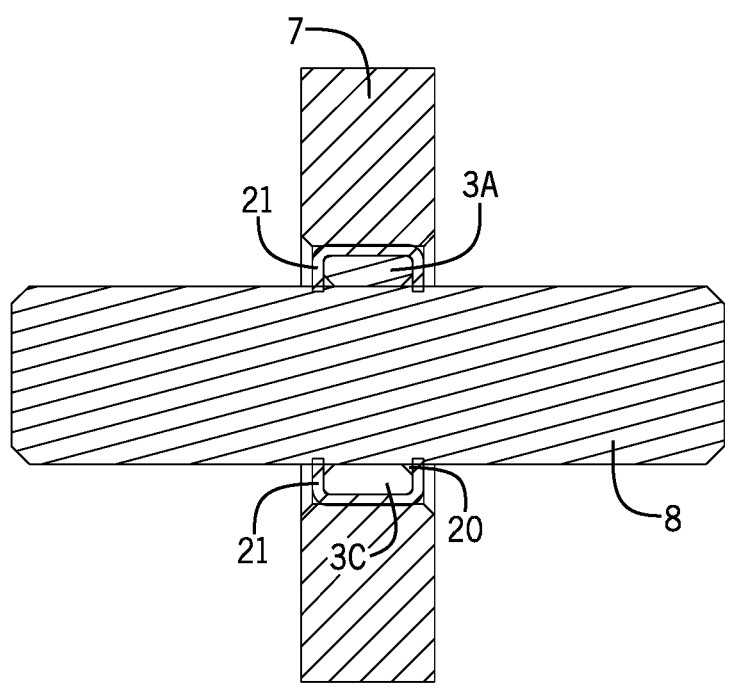
FIG. 7 is a side cross-sectional view of a SABB with a shaft seal similar to that shown in FIG. 6A, but having the channel-shaped shaft seal as the springy element.

The SABB 14 may be configured to have two springy element/shaft seal elements 1A/2A and 1B/2B as depicted in FIGS. 1A-1D, or the springy element and shaft seal may be combined in other configurations. For example, FIGS. 4A-4C show an SABB having two shaft seals 2A, 2B coupled to one springy element 1. Alternatively, FIG. 7 shows an SABB with shaft seals having one channel-shaped shaft seal 21 that also functions as the springy element. Each of these is discussed in further detail below.

FIG. 2A shows another exemplary SABB 14 comprising springy elements 1A, 1B with attached shaft seals 2A, 2B, also having a mounting bracket 10 and a seal screw 9. When installed, the mounting bracket 10 may conceal sealing screw 9, which provides access to fill the SABB with a lubricant. Alternative methods for sealing the lubricant opening are known in the art, such as by press fit.

FIG. 2A also depicts the optional addition of a radial stop 6. In certain examples, the inside diameter of the radial stop surrounds the outside surface of the bearing segments 3A, 3B, 3C and is positioned between the springy elements 1A, 1B such that the radial stop and springy elements coaxially center about shaft 8. When the SABB is inserted into the housing 7, the radial stop 6 limits the radial deflection of the shaft 8 relative to the housing 7 by engaging outside surface of the bearing segments and the inner periphery of the housing. The maximum amount of the shaft 8 radial deflection that the radial stop 6 allows can be changed by changing the dimensions of the radial stop.

A typical order of assembly for the SABB shown in FIG. 2A is:
1) Install the three bearing segments 3A, 3B, 3C into one of the springy element/shaft seal assemblies 1A/2A.
2) Slide the radial stop 6 onto the bearing segments 3A, 3B, 3C next to the springy element 1A.
3) Install the other springy element/shaft seal assembly 1B/2B onto the bearing segments 3A, 3B, 3C as shown.
4) Install the bearing assembly assembled in step 3) into the housing 7 as shown.
5) Insert the shaft 8 into the bearing assembly.
6) Remove the sealing screw 9 from the housing 7, add lubricant 20, if used, and reinstall the sealing screw 9.
7) Insert the bearing assembly from step 6) into the mounting bracket 10 and install onto the system utilizing the bearing assembly using the mounting holes 11A, 11B.

The exemplary embodiment in FIG. 2A can be used as linear or ball joint bearings as well as rotary bearings. As a linear bearing, the shaft seals 2A, 2B will function as wipers as the SABB 14 slides along the length of a shaft 8 or a shaft 8 slides through the fixed SABB.

Figure 3:
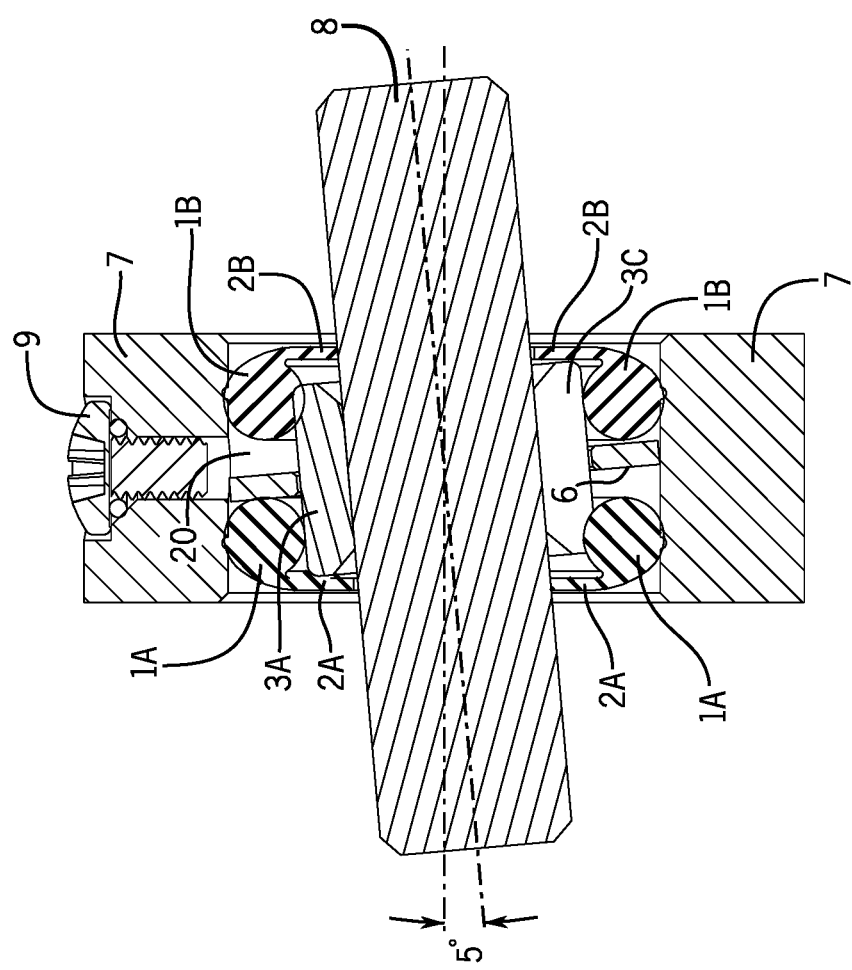
FIG. 3 is a side cross-sectional view of a SABB similar to that shown in FIG. 2, but depicts a 5° angular deflection of the shaft relative to the bearing housing (FIG. 2B depicts no deflection).

FIG. 3 is similar to FIG. 2, but depicts a SABB 14 having shaft 8 angularly displaced from 0° to 5° relative to the housing 7. This exemplary embodiment may be used in a bearing system where there is radial and/or angular misalignment between the housing 7 and, for example, a motor as shaft 8. This embodiment will also absorb radial and angular displacement of the shaft 8 relative to the housing 7 due to out of balance rotating components such as in a turbine assembly or ceiling fan. Since the shaft seals 2A, 2B are attached to the springy elements 1A, 1B, and the springy elements are continually engaged with the bearing segments 3A, 3B, 3C, which are in turn continually engaged with the shaft 8, the seal between the SABB 14 and the shaft 8 is relatively unaffected by the shaft rotation or misalignment.

Figure 4D:
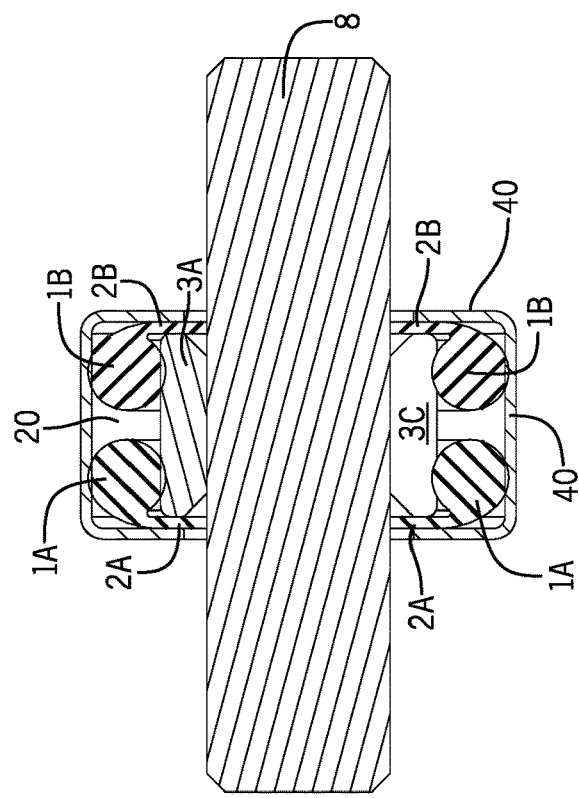
FIG. 4D is a side cross-sectional view of a SABB similar to that shown in FIG. 4C, but having two shaft seals and springy elements.

FIGS. 4A-C depicts an exemplary SABB 14 with one springy element 1 coupled to two shaft seals 2A, 2B. In the case of the springy element and shaft seals being fabricated separately, an intermediary shaft seal base may be bonded between the springy element 1 and the shaft seal 2A, 2B. This allows the SABB to be wider than a single springy element while still allowing the shaft seals to enclose the outside surfaces of the bearing segments. It further allows the SABB to be used as a direct replacement for a standard ½ inch shaft ball bearing with a 1.125 inch outside diameter and 0.375 inches wide as shown in FIG. 4B FIG. 4C is similar to FIGS. 4A-B, but has a bearing housing or steel housing 40 around the outside circumference of the bearing much like a standard ball bearing. The SABB 14 enclosed in the steel housing 40 may alternatively comprise two springy element/shaft seal elements 1A/2A, 1B/2B, allowing the SABB to accommodate any bearing width as depicted in FIGS. 4C and 4D. A person having ordinary skill in the art would recognize that the steel housing 40 may be constructed of materials other than steel.

Figure 5D:
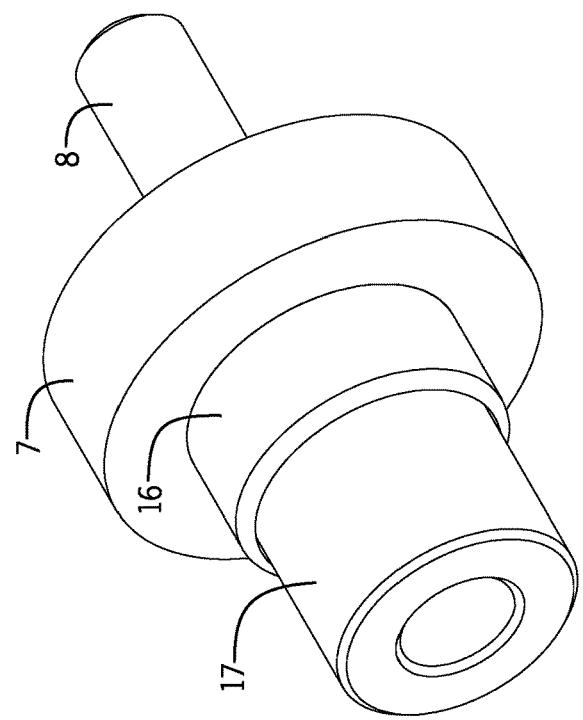
FIG. 5D is a perspective view of the partial SABB installation shown in FIG. 5C.
Figure 5C:
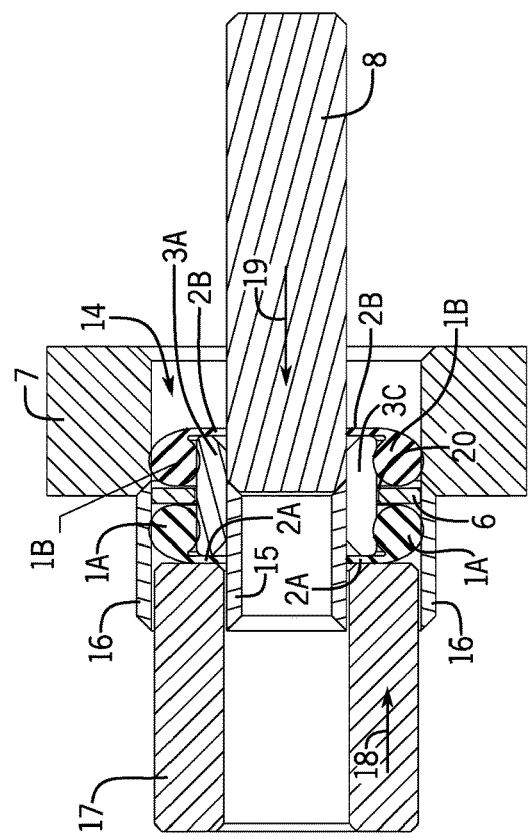
FIG. 5C is a side cross-sectional view of the SABB shown in FIG. 5A, showing the SABB partially installed into the bearing housing and a shaft partially installed inside the SABB, assisted by an installation tool.

FIG. 5A depicts that one advantage of a SABB with a shaft seal is that, using an inner shipping tube 15 and an outer shipping tube 16, the SABB 14 may be shipped fully prefilled or partially prefilled with lubricant 20. FIG. 5C shows the use of an installation tool 17 to push the SABB 14 in the direction 18 into a housing 7. FIG. 5C further shows that the installation tool 17 also retains the bearing segments 3A, 3B, 3C of SABB 14 while the shaft 8 is being inserted in the direction 19, also preventing loss of the prefilled lubricant 20. As an additional benefit of springy elements 1A, 1B maintaining contact between the bearing segments 3A, 3B, 3C and the inner shipping tube 15 and upon insertion, shaft 8, a low viscosity lubrication similar to water may be used. This allows the lubricant 20 to be injected into the SABB 14 between the shaft seals 2A, 2B and the inner shipping tube 15 as shown in FIG. 5A.

Figure 6A:
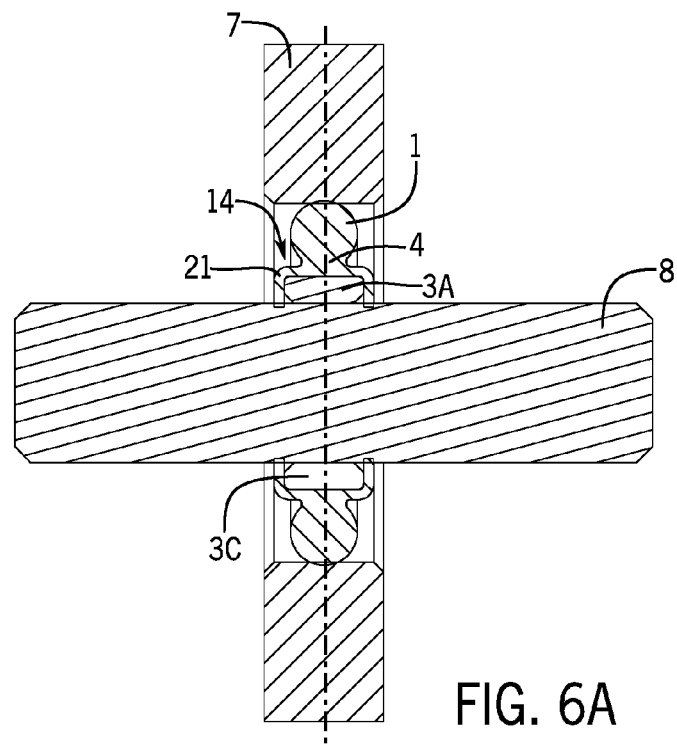
FIG. 6A is a side cross-sectional view of another exemplary SABB with a shaft seal similar to that shown in FIG. 4A, but having a shaft seal with a channel-shaped cross-section.
Figure 6B:
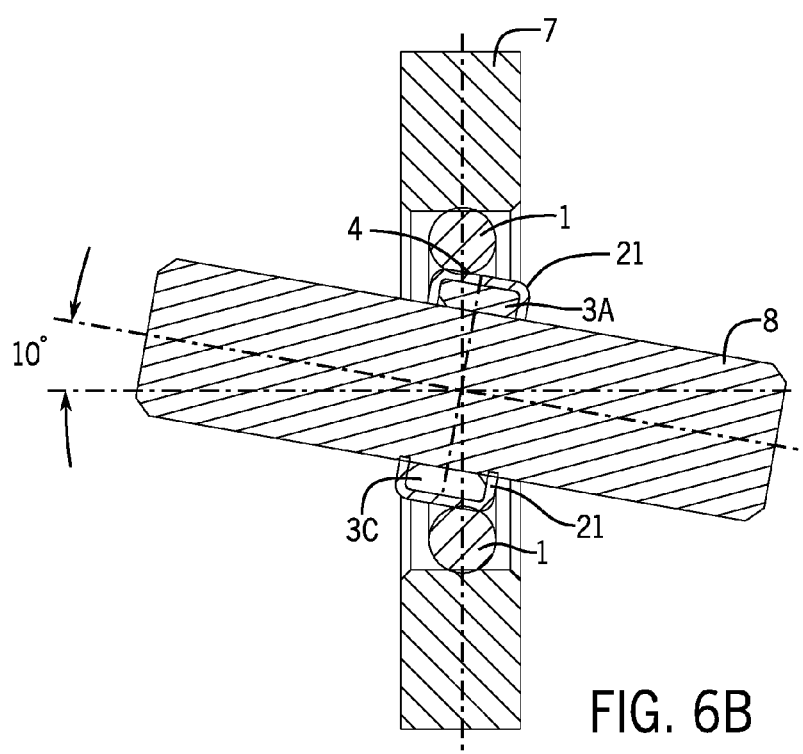
FIG. 6B is a side cross-sectional view showing the SABB shown in FIG. 6A accommodating a 10° angular deflection of the shaft relative to the bearing housing (FIG. 6A depicts no deflection).

FIGS. 6A-B depict an exemplary SABB 14 having a channel-shaped shaft seal 21 coupled to springy element 1, shown as an O-Ring. The channel-shaped shaft seal 21 is coupled 4 to the inside diameter of the springy element 1 at a midpoint of the outside diameter of the channel-shaped shaft seal 21 circumference. As before, the springy element 1 and channel-shaped shaft seal 21 may be fabricated together, or may later be coupled, for example by bonding with super glue or solvent welded. FIG. 6B further depicts the SABB 14 when the shaft 8 is angularly deflected from 0° to 10° relative to the housing 7. Since the channel-shaped shaft seal 21 is attached to the springy element 1 and the springy element 1 is continually engaged with the bearing segments 3A, 3B, 3C, which are in turn continually engaged with the shaft 8, the channel-shaped shaft seal 21 engagement with the shaft 8 is relatively unaffected by the shaft rotation or misalignment.

As shown in FIG. 7, the channel-shaped shaft seal 21 of FIGS. 6A and 6B may also function as the springy element, resulting in a low profile cross-section. This low profile allows the SABB 14 to be used as a replacement in standard bushing bearing applications while still allowing the addition of a lubricant 20.

Figure 8D:
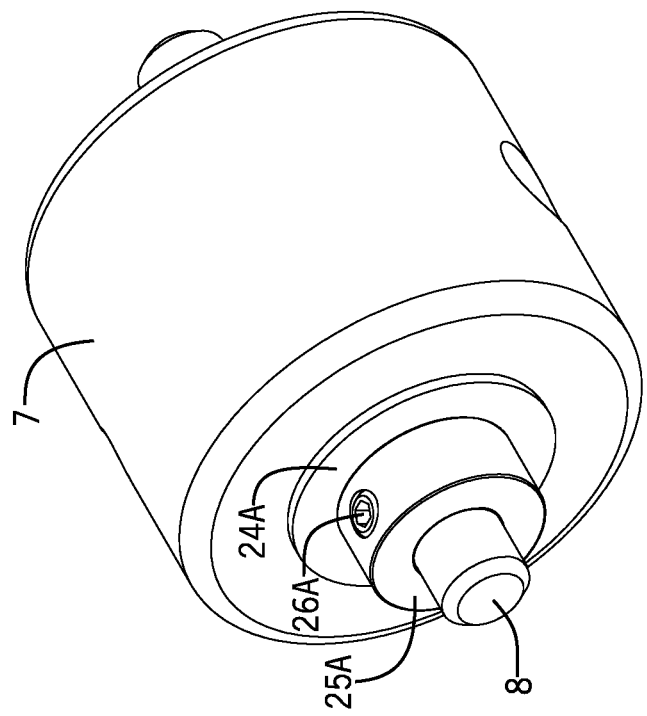
FIG. 8D is a perspective view of the device shown in FIG. 8A.
Figure 8A:
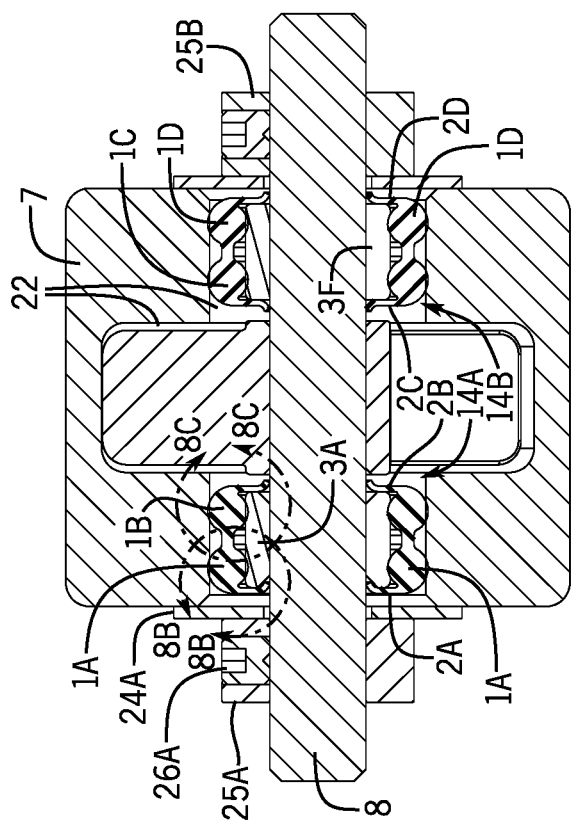
FIG. 8A is a side cross-sectional view of an exemplary application having two SABBs with shaft seals and having the shaft pass through an internal fluid under pressure.

FIG. 8A depicts two SABBs 14A, 14B having springy elements 1A, 1B, 1C, 1D and shaft seals 2A, 2B, 2C, 2D. In addition to the shaft seals optionally sealing a lubricant within an SABB, using the SABBs in a configuration having internal fluid under pressure 22, for example a water pump or gas turbine, also prevents the internal fluid from leaking past the SABBs 14A, 14B. In this regard, the shaft seals not only protect the SABB from external contaminants, but also function as a traditional shaft seal. The figure further depicts retaining washers 24A, 24B and shaft collars 25A, 25B with set screws 26A, 26B used to retain the SABBs 14A, 14B against the internal fluid under pressure 22.

In certain examples, the ends of the shaft seals 2A, 2B that contact the shaft 8 are oriented in the same direction relative to each other (FIG. 8A depicts both shaft seals 2A, 2B being concaved towards the inside of the pump). By contrast, FIG. 8A depicts the ends of shaft seals 2C, 2D being oriented in opposite directions from each other. The shaft seals 2C, 2D are each concaved away from the bearing segment 3B such that shaft seal 2C is concaved towards the inside of the pump and shaft seal 2D is concaved away from the inside of the pump.

Figure 8C:
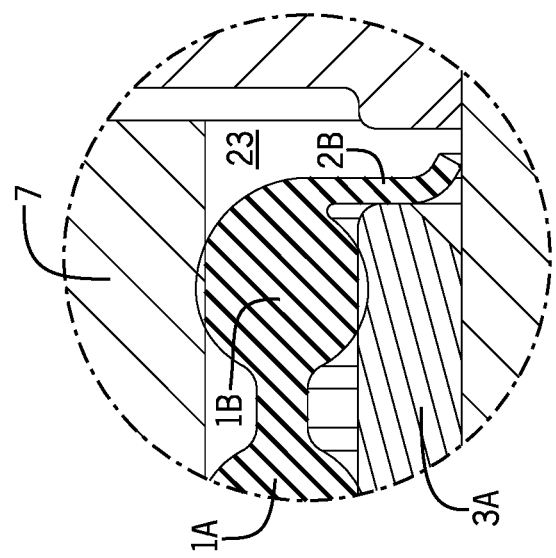
FIGS. 8B and 8C are close-up views of the device shown in FIG. 8A.

FIG. 8C provides a close-up view of the shaft seal 2B of SABB 14A shown in FIG. 8A. The internal fluid under pressure 22 originating from the inside of the pump creates an outward force against the shaft seal 2B (and shaft seal 2C for SABB 14B). As such, orienting shaft seal 2B to be concaved towards the inside of the pump is the most stable orientation relative to the bearing segment 3A. It is considered "stable" because if the shaft 8 is moved axially to the left relative to the bearing segment 3A, the shaft seal 2B will not change its orientation because the internal fluid pressure 23 biases the concaved shaft seal 2B against the shaft 8. In other words, the internal fluid pressure 23 prevents the shaft seal 2B from deflecting away from the shaft 8, thereby preventing shaft seal 2B from changing its orientation from being concaved toward the inside of the pump to being concaved away from the inside of the pump.

Furthermore, the configuration is also stable for shaft seal 2B when moving the shaft 8 axially to the right relative to the bearing segment 3A. Any increase in internal fluid pressure 23 resulting from such a move results in an increase in pressure biasing the shaft seal 2B onto the shaft 8. In this regard, this configuration eliminates the need for garter springs used to hold the seal against the shaft in traditional shaft seals.

In contrast, orienting the shaft seal 2B to be concaved away from the inside of the pump would be "unstable" because if the shaft 8 moved axially to the right relative to the bearing segment 3A, the shaft seal 2B would be free to change its orientation from being concaved away from the inside of the pump to concaved toward the inside of the pump.

Figure 8B:
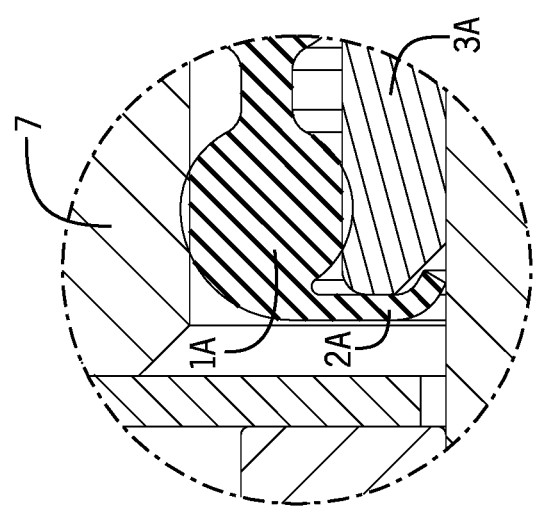

FIGS. 8A-C further depict reducing the interference between the shaft seal 2B and the shaft 8, as well as the potential for deflection, by removing the bearing segment chamfers (bearing segment 3A is shown with a chamfer in FIG. 8B and bearing segment 3F is shown with the chamfer removed in FIG. 8A).

Figure 9A:
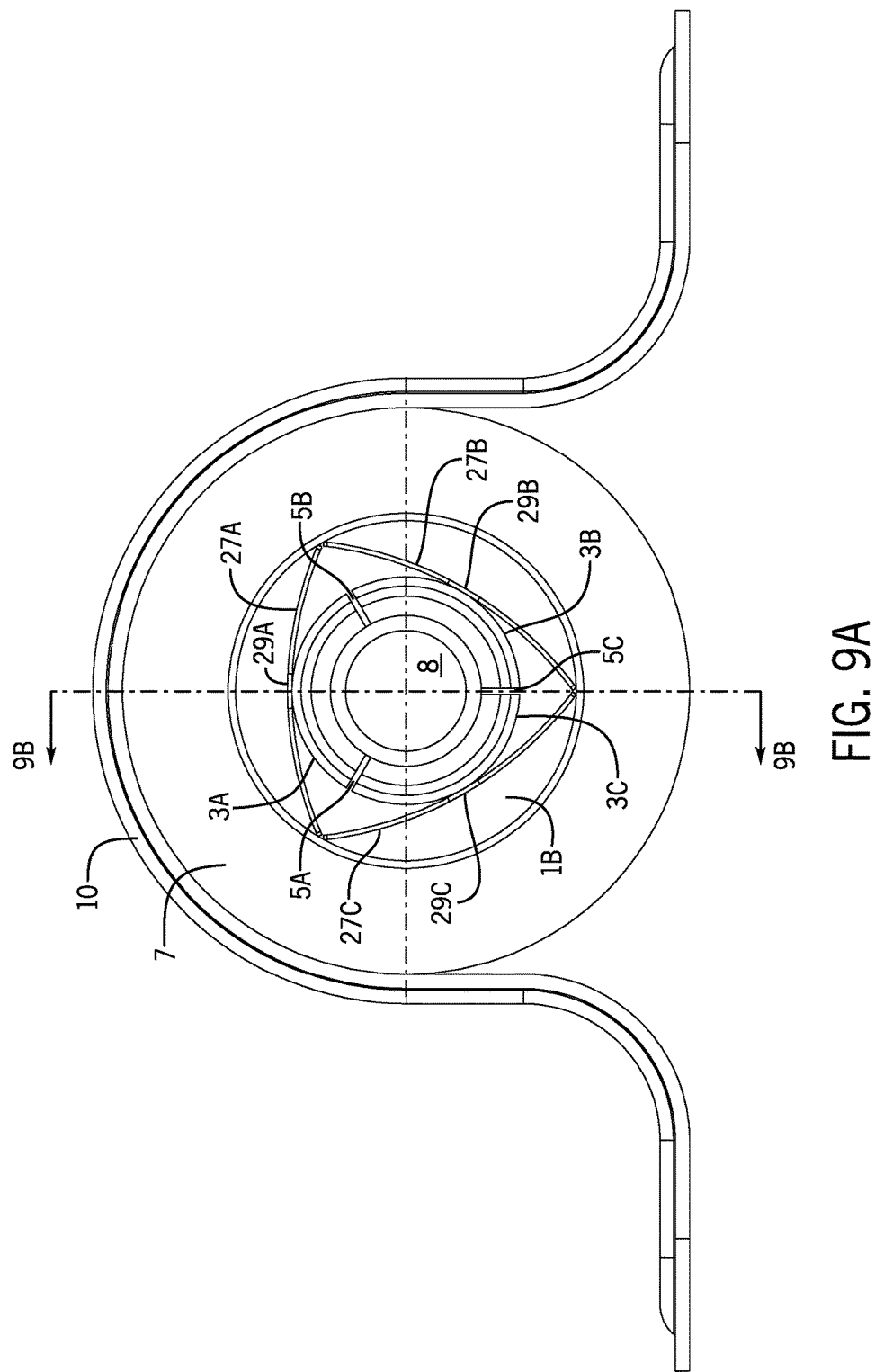
FIG. 9A is an end view of another exemplary SABB with a shaft seal, but having leaf springs as additional, secondary springy elements.

FIGS. 9A-B depicts an exemplary SABB that can also accept secondary springy elements, such as leaf spring 27A, 27B, 27C. The leaf springs may be used for mechanical spring force in addition to the elastomeric compression force created by the springy elements. This additional spring force may act in series or in parallel to springy elements 1A, 1B. Furthermore, additional leaf springs may also be stacked on top of leaf springs 27A, 27B, 27C like an automotive leaf spring assembly to change the force-deflection characteristics.

In certain examples, the springy elements 1A, 1B with shaft seals 2A, 2B are configured such that the leaf spring 27A initially acts independently of the springy elements 1A and 1B. However, after a certain amount of radial deflection of the shaft 8 relative to the housing 7, the springy elements 1A and 1B may then become engaged to assist in biasing the bearing segments 3A, 3B, 3C towards the shaft 8. Alternatively, the SABB can be configured such that the springy elements 1A, 1B engage first.

Leaf springs 27A, 27B, 27C may also comprise hemispherical projections 29A, 29B, 29C, respectively, whereby the projections engage matching conical recess in the outside surfaces of bearing segments 3A, 3B, 3C to maintain their relative positions. In other examples, the two springy elements 1A, 1B may be connected to each other by three elastomeric ribs 28A, 28B, 28C (not shown) made out of the same or another material. The elastomeric ribs 28A, 28B, 28C may help locate the circumferential position of the leaf springs 27A, 27B, 27C.

FIG. 9B further depicts that the springy elements 1A, 1B may help retain the leaf springs 27A, 27B, 27C in contact with the bearing segment 3A, 3B, 3C during assembly. Leaf spring 27C in FIG. 9B depicts that the triangular geometry of the leaf spring is such that it does not interfere with the springy elements 1A, 1B. Further, in the alternative embodiment having elastomeric ribs, the tips of the leaf springs 27A, 27B, 27C may be curved outward to help engage with the elastomeric ribs 28A, 28B, 28C.

FIGS. 11A-B discloses an alternate embodiment wherein the shaft seals 2A, 2B are configurable to add or remove springy elements in accordance with a particular application. As with the other embodiments, FIG. 11A demonstrates that this alternate allows angular deflection of the shaft 8. As shown in FIGS. 11A-11B, the embodiment has three springy elements 28A, 28B, and 28C that each extend perpendicularly from the shaft seal 2A. The springy elements 28A, 28B, 28C may be integrally formed with the shaft seal 2A, or may be added later, for instance by providing barbs on the ends of the springy elements 28A, 28B, and 28C that contact the shaft seal 2A, along with corresponding openings within the shaft seal 2A to receive the barbs (barbs shown for springy elements 28A and 28D). In the configuration shown, the springy elements 28A, 28B, and 28C are arranged to be separated by an equal spacing of 120°, although other configurations are also possible. In this regard, the springy elements 28A, 28B, and 28C not only bias the plurality of bearing segments 3A, 3B, 3C towards the shaft 8, but also assist in maintaining equal spacing between the bearing segments 3A, 3B, and 3C. This is accomplished through the use of recesses within the outer diameter of the bearing segments 3A, 3B and 3C that receive the springy elements 28A, 28B, 28C, as discussed in U.S. patent application Ser. No. 14/961,368, which has been incorporated by reference herein.

It should be noted that additional or fewer springy elements could be added in accordance with a particular application. For example, six springy elements may be used, separated by an equal spacing of 60° apart.

As shown in FIG. 11A, two shaft seals 2A, 2B may be used in conjunction with a single shaft 8 and housing 7 arrangement. In this example, shaft seal 2A is coupled to springy elements 28A, 28B, and 28C and shaft seal 2B is coupled to springy elements 28D, 28E, and 28F. This configuration permits the addition of a radial stop 6 to restrict the angular deflection of the shaft 8. By using the radial stop 6, an optimally shaped lubrication boundary layer is provided with each bearing segments 3A, 3B, 3C, depending on the shaft 8 speed, applied load, and lubricant viscosity.

Although FIGS. 11A-11B generally show the bearing segment gaps 5A, 5B, and 5C to be defined between parallel surfaces of the bearing segments 3A, 3B, and 3C, the bearing segment gaps 5A, 5B, and 5C can also be define a wedge-shaped lubrication boundary. In this configuration, the wedge-shaped lubrication boundary can optimize lubrication similar to Kingsbury thrust washers that are known in the art. The present inventors have further identified that the wedging action can be further enhanced by locating a recess on the outer diameter of the bearing segments 3A, 3B, and 3C as discussed above, but asymmetrically with respect to the center of each bearing segment 3A, 3B, and 3C.

It should be known that while the embodiment shown in FIGS. 11A-11B generally depict the springy elements 28A, 28B, 28C, 28D, 28E, and 28F as being cylindrical and extending parallel to the shaft 8, the springy elements 28A, 28B, 28C, 28D, 28E, and 28F could be prisms, spheres, or other shapes known to a person having ordinary skill in the art.

The SABB presently disclosed provides numerous advantages over bearings presently known in the art. Various lubrication systems may also be used, such as oil-impregnated sintered bushing bearing material, or bushing bearings made out of different materials (stainless steel, Teflon, ultra high molecular weight polyethylene) with a lubricant such as water, baby oil, silicone oil, or graphite added. In certain examples, such as pump bearings, the bearing lubricant may be the actual fluid being pumped. In this regard, if a leak in the seal does occur, it will not contaminate the fluid being pumped.

Furthermore, the SABB may be installed as a direct replacement for bushing bearing and ball/roller bearing applications. In certain cases, the replacement may be direct with little or no changes. For example, the exemplary embodiment shown in FIGS. 4A-C can be used as a direct replacement for a standard 1⅛ inch outside diameter ball bearing with a ½ inch diameter shaft by using bearing segments 3A, 3B, 3C with a ¾ inch outside diameter and springy elements 1 with a 0.210 inch cross-sectional diameter.

The following is a description of the various elements and features included in the exemplary embodiment as shown in the figures.

1, 1A, 1B Springy Elements—one example of "springy elements" is an O-ring
2A, 2B Shaft seal—elastomeric discs that are attached to the side of each O-Ring or part of a single molded part of the same material or co-molded (multi-shot molding) with different materials for the seals and "springy element" portions.
3A, 3B, 3C Bushing bearing segments—the individual bushing bearing segments of the SABB.
3D, 3E, 3F Bushing bearing w/o chamfers—bushing bearing segment without chamfers.
4, 4A, 4B Springy element/shaft seal bond—the location of the attachment between the shaft seal and O-Ring.
5A, 5B, 5C Bearing segment gap—the gap between the individual bushing bearing segments.
6 Radial stop—a washer located between the O-Ring "springy elements" that limits the amount of radial travel of the shaft relative to the bearing housing.
7 Housing—the structure that houses the basic SABB assembly.
8 Shaft—the surface on which the bushing bearing segments rotate around and/or slide.
9 Sealing screw—a screw with an integral O-Ring seal used to seal the opening in the housing used to add lubricant to the bearing assembly.
10 Bracket—a clamp used to secure the bearing assembly to a structure.
11A, 11B Mounting Hole—used to secure the SABB assembly to a structure.
12A, 12B Shaft seal base—the annular disc that is bonded on one side to the O-Ring and on the other side to the shaft seal to space the shaft seals such that the SABB bearing surface width can be maximized and still be a direct replacement to a standard 1.125 in. OD×0.375 wide ball bearing (not shown).
13A, 13B Shaft seal/shaft seal base bond—the bond between the shaft seal and the shaft seal base (not shown).
14 SABB assembly—the basic SABB unit.
15 Inner shipping tube—a tube used to substitute for the shaft allowing the SABB to be prefilled with lubricant.
16 Outer shipping tube—a tube used to substitute for the housing allowing the SABB to be prefilled with lubricant.
17 Installation tool—a hollow cylinder that supports the SABB while it is being inserted into a housing and when a shaft is inserted into the SABB.
18 SABB insert into housing—the force and direction of the installation tool when inserting the SABB into a housing.
19 Shaft insert into SABB—the force and direction of the shaft when inserting the shaft into the SABB.
20 Lubricant—filled or partially filled lubricant within the SABB.
21 Channel-shaped shaft seal—the channel-shaped cross-section shaft seal.
22 Internal fluid under pressure—fluid under pressure being sealed by the SABB springy element with integral shaft seal.
23 Internal fluid pressure—the direction that the internal fluid pressure acts on the springy element with shaft seal.
24A, 24B Retaining Washer—washer used to retain the SABB against the internal pressure.
25A, 25B Shaft Collar—shaft collar used to retain the SABB against the internal pressure.
26A, 26B Set Screw—set screws used to secure the shaft collar 25A, 25B to the shaft 8.
27A, 27B, 27C Leaf spring—additional leaf spring springy element.
28A, 28B, 28C, 28D, 28E, 28F Elastomeric rib—rib connecting elastomeric "O-Ring" shaped "spring elements" (not shown), or extending from a shaft seal as a "springy element".
29A, 29B, 29C Hemispherical Projection—a hemispherical shaped projections at the center of each leaf spring that engage conical recesses in the outside diameter of the bearing segments (not shown).

40 Steel Housing—a housing surrounding the outer periphery of the springy element and SABB (alternatives to steel may be used).

What is claimed is:

1. A self-adjusting bushing bearing that is receivable within a housing and configured to control movement of a shaft therein, comprising:
   a plurality of bearing segments configured to receive the shaft therein;
   a springy element disposed between the housing and the plurality of bearing segments,
   wherein the springy element is configured to bias the plurality of bearing segments radially inwardly towards the shaft;
   a first shaft seal that is coupled at a first end to the springy element and extends radially inwardly to contact the shaft at a second end that is opposite the first end, wherein the first shaft seal forms an operable seal between the plurality of bearing segments and the shaft; and
   a second shaft seal that is coupled at a first end to the springy element and extends radially inwardly to contact the shaft at a second end that is opposite the first end, wherein the second shaft seal forms an operable seal between the plurality of bearing segments and the shaft.

2. The self-adjusting bushing bearing according to claim 1, wherein the springy element forms an operable seal between the housing and the plurality of bearing segments.

3. The self-adjusting bushing bearing according to claim 2, wherein the first shaft seal is configured to seal a lubricant within the self-adjusting bushing bearing.

4. The self-adjusting bushing bearing according to claim 2, wherein the first shaft seal is configured to seal a gas within the self-adjusting bushing bearing.

5. The self-adjusting bushing bearing according to claim 1, wherein the springy element and the first shaft seal are integrally formed.

6. The self-adjusting bushing bearing according to claim 1, wherein the springy element has a circular cross-sectional shape.

7. The self-adjusting bushing bearing according to claim 1, wherein the second end of the first shaft seal is concaved inwardly towards the plurality of bearing segments.

8. The self-adjusting bushing bearing according to claim 1, wherein the first end of the first shaft seal and the first end of the second shaft seal are coupled to opposite sides of the springy element.

9. The self-adjusting bushing bearing according to claim 8, wherein the springy element has a rectangular cross-sectional shape.

10. The self-adjusting bushing bearing according to claim 1, wherein the springy element comprises a cylindrical shape that is coaxially aligned with the shaft.

11. The self-adjusting bushing bearing according to claim 1, further comprising a bearing housing that encloses the outside circumference of the springy element.

12. The self-adjusting bushing bearing according to claim 1, wherein the first shaft seal is configured to prevent a contaminant from entering the self-adjusting bushing bearing.

13. The self-adjusting bushing bearing according to claim 1, further comprising the housing encloses the outside circumference of the springy element, wherein the springy element forms an operable seal between the bearing housing and the shaft to seal a lubricant within the self-adjusting bushing bearing.

14. A self-adjusting bushing bearing that is receivable within a housing and configured to control movement of a shaft therein, comprising:
   a plurality of bearing segments configured to receive the shaft therein;
   a first springy element and a second springy element each disposed between the housing and the plurality of bearing segments, wherein the first springy element and the second springy element are configured to bias the plurality of bearing segments radially inwardly towards the shaft;
   a first shaft seal that is coupled at a first end to the first springy element and extends radially inwardly to contact the shaft at a second end that is opposite the first end, a second shaft seal that is coupled at a first end to the second springy element and extends radially inwardly to contact the shaft at a second end that is opposite the first end, wherein the first shaft seal and the second shaft seal each form an operable seal between the plurality of bearing segments and the shaft; and
   a secondary springy element radially disposed between the housing and the plurality of bearing segments and transversely disposed between the first springy element and the second springy element.

15. A system to control movement of a shaft within a housing and having a first self-adjusting bushing bearing comprising:
   a first plurality of bearing segments configured to receive the shaft therein;
   a first springy element disposed between the housing and the first plurality of bearing segments, wherein the first springy element is configured to bias the first plurality of bearing segments radially inwardly towards the shaft;
   a first shaft seal that is coupled at a first end to the first springy element and extends radially inwardly to contact the shaft at a second end that is opposite the first end, wherein the first shaft seal forms an operable seal between the first plurality of bearing segments and the shaft; and
   a second shaft seal that is coupled at a first end to the springy element and extends radially inwardly to contact the shaft at a second end that is opposite the first end, wherein the second shaft seal forms an operable seal between the plurality of bearing segments and the shaft;
   wherein the housing contains the first springy element, the first shaft seal, and the second shaft seal, the first plurality of bearing segments, and the shaft.

16. The system according to claim 15, further including a second self-adjusting bushing bearing comprising:
   a second plurality of bearing segments configured to receive the shaft therein and configured to provide an operable seal between the second plurality of bearing segments and the shaft;
   a second springy element disposed between the housing and the second plurality of bearing segments, wherein the second springy element is configured to bias the second plurality of bearing segments radially inwardly towards the shaft; and
   a third shaft seal that is coupled at a first end to the second springy element and extends radially inwardly to contact the shaft at a second end that is opposite the first end, wherein the third shaft seal forms an operable seal between the second plurality of bearing segments and the shaft;

a fourth shaft seal that is coupled at a first end to the second spring element and extends radially inwardly to contact the shaft at a second end that is opposite the first end, wherein the fourth shaft seal forms an operable seal between the second plurality of bearing segments and the shaft; and wherein the housing contains the second springy element, the third shaft seal, the fourth shaft seal, the second plurality of bearing segments, and the shaft, wherein the first self-adjusting bushing bearing is configured to seal a lubricant therein and the second self-adjusting bushing bearing is configured to seal a lubricant therein such that neither of the lubricants contacts the shaft or the housing between the first self-adjusting bushing bearing and the second self-adjusting bushing bearing.

* * * * *